United States Patent [19]

Bissell et al.

[11] Patent Number: 5,357,395
[45] Date of Patent: Oct. 18, 1994

[54] UNDERVOLTAGE PROTECTION CIRCUIT, SYSTEM AND METHOD OF OPERATING SAME

[75] Inventors: Steven A. Bissell, Austin; Robert B. Hyde, Round Rock; Marvin W. Rasmussen, Austin, all of Tex.

[73] Assignee: Schlumberger Technology Corporation, Austin, Tex.

[21] Appl. No.: 904,392

[22] Filed: Jun. 25, 1992

[51] Int. Cl.$^5$ .............................................. H02H 3/24
[52] U.S. Cl. ................................................ 361/92; 361/88
[58] Field of Search .................... 361/92, 94, 88, 89, 361/90

[56] References Cited

U.S. PATENT DOCUMENTS

| | | | |
|---|---|---|---|
| 3,937,937 | 2/1976 | McVey | 235/153 R |
| 4,096,560 | 6/1978 | Footh | 364/200 |
| 4,143,283 | 3/1979 | Graf et al. | 361/92 |
| 4,404,473 | 9/1983 | Fox | 361/93 |
| 4,412,267 | 10/1983 | Hansen | 361/94 |
| 4,486,802 | 12/1984 | Claussen | 361/93 |
| 4,509,102 | 4/1985 | Ayer | 361/92 |
| 4,720,758 | 1/1988 | Winslow | 361/93 |
| 4,771,357 | 9/1988 | Lorincz et al. | 361/87 |
| 4,827,149 | 5/1989 | Yabe | 361/88 |

OTHER PUBLICATIONS

Bonicatto, Damian G., "Design Ideas," EDN, Oct. 16, 1986, p. 236.
Motorola, Inc. "Programmable Unijunction Transistor," Motorola Thyristor Device Data, 1988, pp. 3–79 to 3–82.
Motorola, Inc. "Micropower Undervoltage Sensing Circuits," Motorola Semiconductor Technical Data, 1990, pp. 1–7.
Motorola, Inc. "Darlington Transistors," Motorola Small-Signal Transistors, FETs and Diodes, 1989, pp. 2–62 to 2–65.

Primary Examiner—A. D. Pellinen
Assistant Examiner—S. Jackson
Attorney, Agent, or Firm—Kevin L. Daffer

[57] ABSTRACT

An undervoltage protection circuit, system and method is prodded for sending a reset signal to an electronic device during undervoltage time periods in which the device power supply voltage is less than a desired amount. The protection circuit includes a sensing circuit and a latching network adapted to quickly discharge a storage capacitor when the sensing circuit senses the undervoltages. A buffer network is included to send a reset signal to the electronic device whenever the storage capacitor discharges to a low latched level. The reset signal exists substantially throughout the undervoltage time period and also for a set delay period after the undervoltage time period ceases. During receipt of the reset signal, the electronic device will be inhibited from incurring damage or loss of data.

20 Claims, 2 Drawing Sheets

UNDERVOLTAGE PROTECTION CIRCUIT, SYSTEM AND METHOD OF OPERATING SAME

BACKGROUND OF THE INVENTION

I. Field of the Invention

This invention relates to a circuit, system and method for protecting an electronic device against malfunctions caused by undervoltage conditions on the device's power supply.

II. Description of the Relevant Art

It is important when operating an electronic device that the supply which powers the device be carefully monitored. In particular, the supply voltage must be maintained within a tolerance range necessary to ensure proper operation of the device. If the supply voltage deviates outside the tolerance range, then the device may malfunction or, worse yet, may be destroyed.

Typically, there are many ways in which a power supply may fail. The supply may experience a complete loss of power. In such a situation, an auxiliary battery backup supply may be used during the power interruption period. Another type of failure occurs whenever the power supply does not completely fail, but fluctuates outside a specified tolerance range. The power supply may therefore experience either a relatively short or long period of overvoltage or undervoltage. Moreover, if the damping of the load device is insufficient, the power supply will overshoot to overvoltage or undervoltage during its ramping from the undervoltage or overvoltage condition, respectively.

Voltages sufficiently above the tolerance range can cause destruction of the components of the device resulting in a significant amount of attention given to such a situation. It is usual to find overvoltage detection and clamping or shutdown circuits incorporated in the device's power supply in order to prevent these situations. Although overvoltages should never occur, they often do occur and, if they do occur, are remedied within the power supply itself. Undervoltages, on the other hand, occur as a normal part of operation. Undervoltages occur whenever the device is powered on or off, whenever the power supply fails or is disconnected, and whenever the primary source of power drops below some critical level (e.g., whenever brownouts and sub-second interruptions occur associated with AC line-powered devices). When the supply voltage provided to the components making up the device is below a tolerance level for proper operation, the device will malfunction in one or more of the following ways: (1) all operations cease, but resume after the supply voltage returns to within its tolerance level range; (2) all operations cease, and do not resume even after the supply voltage returns to within its tolerance level range; (3) unplanned, improper operations occur, but proper operations resume when the supply voltage returns to within its tolerance level range; and (4) unplanned, improper operations occur, and remain even after the supply voltage returns to within its tolerance range. Situations two through four are at best an inconvenience, and at worst a safety hazard and/or damaging to the device. The first situation is therefore a more suitable way in which to protect the device against the more commonly occurring undervoltage condition.

As opposed to overvoltage conditions, undervoltages present unique problems in maintaining the integrity of the device during the undervoltage and allowing normal operations after the undervoltage. A conventional method used to boost the power supply during a period of undervoltage using a conventional battery backup system is described in U.S. Pat. No. 4,143,283 to Graf et al. Another conventional system using a battery backup to prevent device failure during periods of overvoltage or undervoltage is described in U.S. Pat. No. 4,096,560 to Footh. Such conventional designs which utilize a battery backup system will eventually fail thereby causing an undervoltage whenever the finite life of the battery backup expires. Thus, long periods of undervoltages cannot be prevented with a battery backup system. Conversely, relatively short periods of undervoltages may often go undetected, and, if the undervoltage occurs, even for a short period of time, the electronic device may malfunction.

Undervoltages, often being more difficult to detect and remedy than overvoltages, must either maintain a separate battery boost supply or must incorporate a circuit which sends a reset signal to inhibit the device during periods of undervoltage. In the latter case, the reset signal will inhibit the device and place the device in a halt mode to avoid damage to the device or improper operation. After the reset signal ends, the device begins again with normal operation.

Although protection circuits which provide a reset signal instead of a supply boost achieve the first situation of the four situations stated above and are therefore preferable in operation, many conventional reset-type protection circuits must also maintain a power supply separate from the supply powering the device. In order for the protection circuit to avoid being susceptible to the power supply of the device, a separate, isolated protection circuit supply is needed. An exemplary protection circuit using a battery backup supply separate from the device's power supply is shown in U.S. Pat. No. 4,096,560.

Another problem associated with many conventional protection circuits is that the duration of the reset signal does not extend for a substantial portion of the time period in which the undervoltage occurs. Specifically, the reset signal is placed in an active logic state for a set period of time and is generally used to quickly inhibit the device operation. However, if the undervoltage time period is longer than the reset signal duration, the device may improperly attempt to begin operation.

A still further problem associated with many conventional protection circuits is their inability to maintain the reset signal after the undervoltage period ends. Oftentimes, the power supply feeds a load device which is underdamped. An underdamped load may cause the supply voltage to temporarily rise to an overvoltage condition once the undervoltage condition ends. The overshoot from undervoltage to overvoltage at the end of the undervoltage period may present problems to the electronic device unless the reset signal remains throughout the overshoot period.

SUMMARY OF THE INVENTION

The problems outlined above are in large part solved by the undervoltage protection circuit, systems and method of the present invention. That is, the undervoltage protection of the present invention is powered by the same DC power supply as that used by the electronic device. Fluctuations or undervoltages in the DC power supply do not affect normal operation of the protection circuit. As such, the protection circuit of the present invention avoids having to use and maintain a separate power supply. By uniquely configuring a storage capacitor and a latching network within the protection circuit, the present invention can achieve a variable length reset signal which can extend substantially the entire duration of the undervoltage time period and a set delay period after the undervoltage time period ceases. The undervoltage protection circuit with shared power supply and variable length reset with delay is particularly adapted to overcome many of the problems encountered by conventional protection circuits.

Broadly speaking, the undervoltage protection circuit of the present invention comprises a sensing circuit capable of receiving a DC power supply voltage and a reference voltage. A latching network is coupled to the sensing circuit such that the latching network is adapted to quickly discharge a storage capacitor to a latched voltage value during an undervoltage time period in which the DC power supply voltage is less than the referenced voltage. A buffer is connected to the output of the latching network to receive the latched voltage value and produce a reset signal during the undervoltage time period. The buffer also maintains the reset signal for a set delay period after the undervoltage time period ceases.

The present invention also contemplates a system for inhibiting the operation of a load device. The system includes an electronic device coupled to receive power from a DC power supply. An undervoltage protection circuit, also powered by the DC power supply, is used to send a reset signal to the electronic device whenever the DC power supply drops below a reference value. The undervoltage protection circuit includes a sensing circuit, a latching network, a current limiting resistor, a storage capacitor and a buffer. The sensing circuit is adapted to compare the DC power supply voltage with the reference voltage and produce a relatively low voltage during each undervoltage time period. The latching network receives the low output voltage from the sensing circuit and programmably forms a corresponding conductive discharge path. The current limiting resistor and storage capacitor thereby provide a delayed charging of the capacitor through the conductive charge path allowing the buffer to produce a resulting reset signal to the device.

The present invention further includes a method for inhibiting the operation of an electronic device. The method includes the steps of providing a DC power supply and a protection circuit which includes a buffer network coupled to a charged capacitor. Voltage from the DC power supply which is less than a reference voltage is then sensed and the capacitor is discharged to a latched voltage value. The latched voltage value is sent through the buffer network and level shifted to produce a reset output signal for inhibiting or halting operation of the load device.

BRIEF DESCRIPTION OF THE DRAWINGS

Other features and advantages of the invention will become apparent upon reading the following detailed descriptions and upon reference to the accompanying drawings in which.

Figure 1:
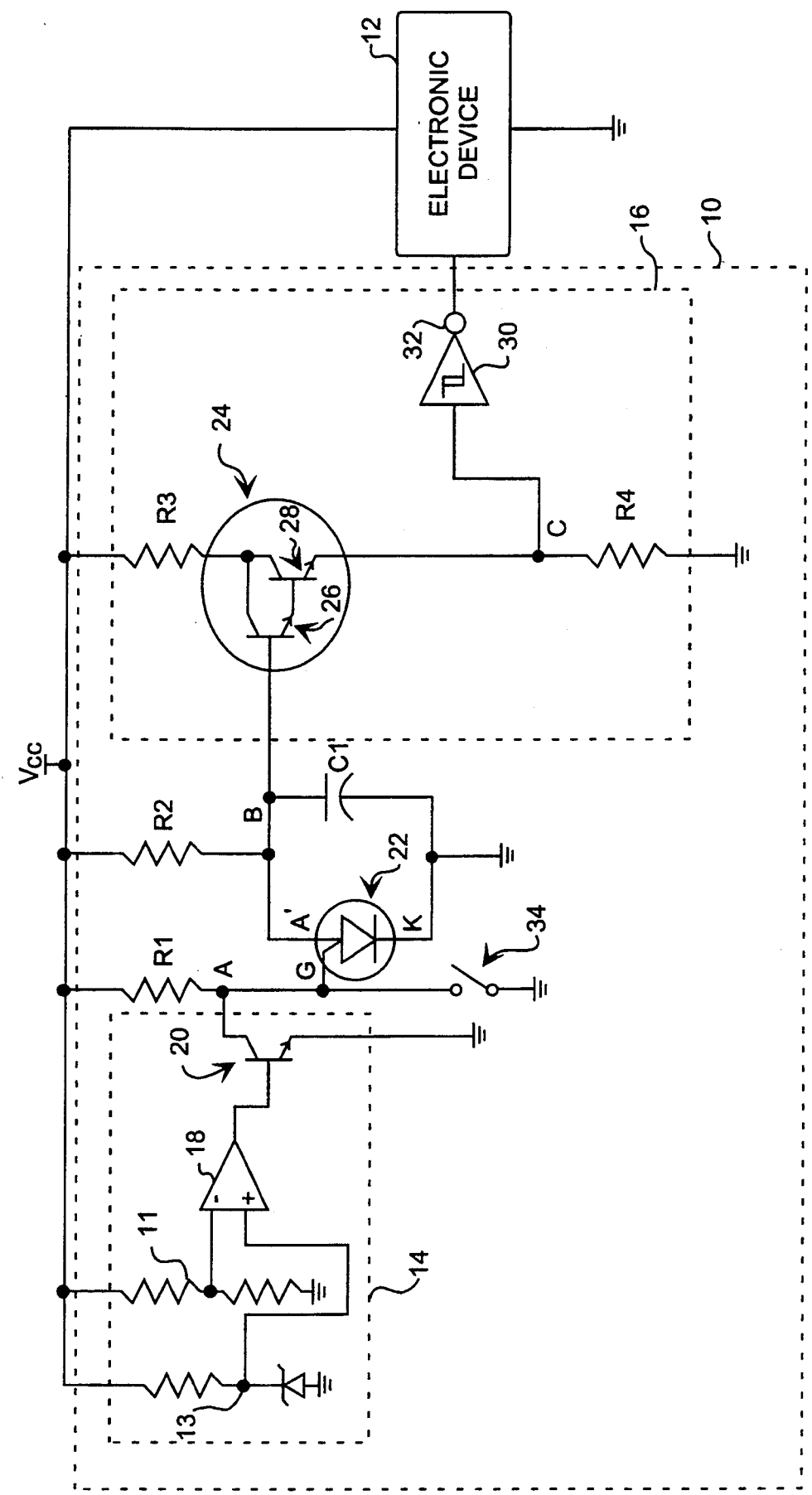
FIG. 1 is a schematic view of an undervoltage protection circuit and system according to the present invention.

While the invention is susceptible to various modification and alternative forms, a specific embodiment thereof has been shown by way of example in the drawings and will herein be described in detail. It should be understood, however, that the drawings and description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF THE INVENTION

Turning now to the drawings, FIG. 1 illustrates a protection circuit 10 powered by a DC power supply (VCC). Also powered by VCC is an electronic device 12 adapted to receive a reset signal from protection circuit 10 whenever VCC experiences an undervoltage. Typically VCC remains at a specified voltage optimal for operation of device 12. However, VCC may undergo fluctuations which draw the power supply from its optimal operating voltage to an undervoltage condition. The fluctuations can be fairly short (less than 1 millisecond) or they can remain for many minutes or even hours.

Within protection circuit 10 is a sensing circuit 14 and a buffer network 16 indicated by dashed lines. Sensing circuit 14 functions to receive and compare VCC with a reference voltage (VREF). VREF is a DC voltage derived from VCC, but at a fixed level determined by the solid state physics of a Zener diode network 13. So that the VREF circuit will operate over a large range of VCC levels, VREF is generally set at a low value (typically 1.25 volts) which is compared to the output of a resistive voltage divider 11 set at an amount proportional to the value of VCC (i.e., VCC/R, where R is the voltage divider ratio). For simplicity, VCC is compared directly to VREF wherein, in actuality, a ratio of VCC/R is being compared to VREF. It is important to note that reference voltage, VREF, is internally generated within circuit 10 and does not require a separate power supply. Moreover, ratio R is derived from resistor divider network 11, and diode 13 provides VREF at a fixed voltage level on the non-inverting input of comparator 18 as shown in FIG. 1. The value of VREF is chosen to be slightly less than the optimal value of VCC. For example, if VCC is designed to optimally produce 5 volts, then VREF may be set to a certain percentage less than 5 volts or, e.g., 4.5 volts. Whatever operating voltage is chosen for VCC, it is important to note that VREF can be set to a corresponding lesser value necessary for operation with various logic families such as bipolar, FET (NMOS and CMOS), ECL, etc.

Whenever VCC drops to a level less than VREF, indicating an undervoltage condition, comparator 18 produces a relatively high voltage output. The output from comparator 18 is coupled to the input of transistor 20. Input on the base of transistor 20 modulates the collector/emitter path of transistor 20. A relatively high output from comparator 18 will therefore produce a relatively low voltage at node A and, conversely, a relatively low output from comparator 18 will produce a relatively high voltage a node A. A suitable sensing circuit 14 which includes comparator 18 and transistor 20 can be purchased from Motorola Semiconductor, Inc. as Part No. MC34164. During times of undervoltage, Part No. MC34164 is capable of sinking a relatively low voltage at node A of approximately 0.1–0.4 volts. If VCC drops to an undervoltage condition for a relatively short duration of time (e.g., for a time period less than one to two microseconds), then node A will drop to a low level state even before sensing circuit 14 is activated. Thus, without encountering the normal operational delay of circuit 14, short duration undervoltages can be directly detected by the present invention at node A to quickly begin the discharge of node B.

The output of sensing circuit 14 is connected at node A to a latching network which includes a biasing resistor R1 and a programmable unijunction transistor 22. A suitable programmable unijunction transistor may be obtained from Motorola Semiconductor, Inc., Part No. 2N6027. Transistor 22 functions by allowing current to conduct between $A^1$ and K terminals whenever voltage at the G terminal is at least some threshold voltage below the $A^1$ terminal. Threshold voltage is sometimes referred to as turn-on voltage and is dependent upon the characteristics of the specific device chosen to carry out the unijunction transistor function. If the device chosen is Part No. 2N6027, then node B will be discharged near ground whenever terminal G drops more than about 0.8 volts below terminal $A^1$.

Unijunction transistor 22 will remain on for as long as the current flowing between the $A^1$ and K terminals remains above some minimum value. Once capacitor C1 is discharged, current flowing through the $A^1$ and K terminals is limited by a current-limiting resistor R2. Resistor R2 must be carefully sized in relation to C1. Resistor R2 must not be so large as would prevent capacitor C1 from charging and resistor R2 must not be too small or it will prevent transistor 22 from ever turning off. Resistor R2 must be carefully chosen in proportion to the magnitude of VCC and capacitor C1. Furthermore, resistor R2 is sized to allow slow charging of capacitor C1 whenever unijunction transistor 22 is off.

Storage capacitor C1 must also be carefully sized. With unijunction transistor 22 off, capacitor C1 must be large enough to provide a charging time delay. However, C1 must be appropriately sited to match the characteristics of transistor 22 and to allow quick discharge through the discharge path formed whenever transistor 22 is on. By designing a somewhat long charging period, C1 is optimally arranged and sized to maintain a reset signal for a selective time duration after the period of undervoltage ceases. Yet, C1 is also arranged to quickly discharge such that the reset signal appears almost immediately after the undervoltage time period begins. Accordingly, by uniquely arranging the charging capacitor C1 in relation to resistor R2 and latching transistor 22, the reset signal will exist both during the undervoltage time period and for a set delay period after the undervoltage time period ceases.

The charge/discharge state of the storage capacitor C1 is coupled at node B to the input of buffer 16. Buffer 16 includes a Darlington pair 24, often referred to as a Darlington amplifier or double emitter follower. A suitable Darlington pair 24 can be purchased from Motorola Semiconductor, Inc., Part No. 2N6427. The Darlington pair consists of a first transistor 26 and a second transistor 28, wherein the collectors of the two transistors 26 and 28 are connected together. The emitter of the first transistor 26 is coupled to the base of a second transistor 28. The emitter of the second transistor thereby serves as the emitter for the pair. The amplification of a Darlington pair is equal to the product of the amplification factors of the individual transistors as connected in the system, and the voltage drop between the base and emitter is equal to the sum of the base-emitter voltages (which is fixed by the physics of the device). Coupled to the output or collector-emitter path of the Darlington pair 24 is a level shifter comprising resistors R3 and R4. Thus, Darlington pair 24 and level shift resistors R3 and R4 serve to isolate the resistor-capacitor network (R2 and C1) from the output node C such that the reset signal duration is determined only by the value of R2 and C1. Darlington pair 24 and resistors R3 and R4 also serve to shift the output signal to a target output level compatible with various logic families operating at differing voltage levels.

Merely as an example, using bipolar logic levels with an optimal VCC=5.0 volts and resistors R1 and R2 being 1K ohms and 69.8K ohms, respectively, and using the Motorola part numbers specified above, when an undervoltage condition occurs, node A will drop to a relatively low voltage level between 0.1 and 0.4 volts (i.e., above the 0.8 volt threshold of transistor 22) causing unijunction transistor 22 to turn on. With transistor 22 being on, a conductive discharge path between node B and ground is formed to allow storage capacitor C1 of approximately 0.22 microfarad to discharge from approximately VCC=5.0 volts to approximately 1 volt. Since part no. 2N6427 for Darlington pair 24 has a turn-on voltage of 1.6 volts, the discharged voltage of 1 volt latched at node B is not sufficient to turn on the Darlington pair. Resistor R4 thereby functions as a pull-down resistor dropping the voltage a node C to approximately 0 volts. A corresponding high voltage or reset signal will appear at the input of device 12 as will be discussed below. After the undervoltage condition ceases, a voltage will appear at node A which is greater than the previous voltage on node B allowing transistor 22 to turn off. With transistor 22 off, capacitor C1 will charge to a value approximately equal to VCC. However, the time it takes for capacitor C1 to charge to a value exceeding the turn-on voltage of part no. 2N6427 (e.g., 1.6 volts) represents a time delay period in which reset signal continues being produced. Continuing to use a bipolar example and the exemplary values set forth above, the set delay period allotted for continuing the reset signal after cessation of the undervoltage is an amount proportional to the values of R2 and C1 of the resistor-capacitor network. It is important to note, however, that the part numbers listed above and the values for each component are mentioned only as an example. Provided the basic function described above remains intact, other part numbers and components can be substituted including discrete components.

Resistor R4 is substantially larger than resistor R3 so that node C will quickly pull-up to a value near that of node B (less the turn-on voltage drop) whenever Darlington pair 24 is turned on. Conversely, when Darlington pair 24 is off, then node C will remain near ground potential. During undervoltage conditions, node C will remain low since capacitor C1 is discharged below the turn-on voltage of Darlington pair 24. A low input to Schmitt Trigger 30 at node C will produce a corresponding relatively low output from Schmitt Trigger 30. Schmitt Trigger 30, being a multivibrator circuit, produces stable, substantially rectangular waves, regardless of input wave form. Schmitt Trigger 30 remains off until a specified rise turn-on or threshold voltage is crossed; then it is actuated, and the output voltage abruptly rises. When the input voltage falls back below the triggering level, the output voltage drops to zero almost instantly. The rise and fall thresholds may often be different from each other depending upon the specific characteristics of the Schmitt Trigger and the application in which it is used. A suitable Schmitt Trigger may be purchased from Texas Instruments, Inc., Part No. 74HCT14.

At the output of Schmitt Trigger 30 is an invertor 32 which operates to provide a reset signal of proper logic state to electronic device 12. Thus, the reset signal is denoted as a relatively high voltage level sent from the output of invertor 32 to electronic device 12 during an undervoltage time period and for a short time period thereafter. A voltage level on node C which does not exceed the threshold of Schmitt Trigger 30 will therefore input a relatively low voltage to inverter 32 which then presents a high level signal or reset signal to device 12.

Resistors R3 and R4 can vary in size depending upon the operating environment chosen. It is important, however, that R4 be chosen much larger than R3 to allow substantial pull-up of node C whenever Darlington pair is on. If bipolar logic is used having the parts described above, then suitable R3 and R4 values are 100 ohms and 1000 ohms, respectively. These values provide the preferred function of pulling up and down node C to correspond to bipolar logic level for Schmitt Trigger 30 and device 12. However, it is important to note that discrete devices can be substituted for Schmitt Trigger 30 to provide the same function but without being constrained to a specific bipolar input value.

A manual reset switch 34 may be placed between a ground potential and the G terminal of unijunction transistor 22. When switch 24 is held in an open position, the voltage on storage capacitor C1 will not discharge therefore allowing a relatively high voltage on node C. When switch 24 is open, a reset signal will therefore not appear at the input of device 12. Conversely, if switch 34 is closed, unijunction transistor 22 will turn on and storage capacitor C1 will discharge and be latched to a voltage value below the turn-on voltage of Darlington pair 24 thereby causing a relatively low voltage on node C and a reset signal will appear at the output of invertor 32. By using manual switch 34 and therefore bypassing the automatic sensing function of circuit 14, a reset signal can occur at the operator's discretion–regardless of VCC value.

Figure 2:
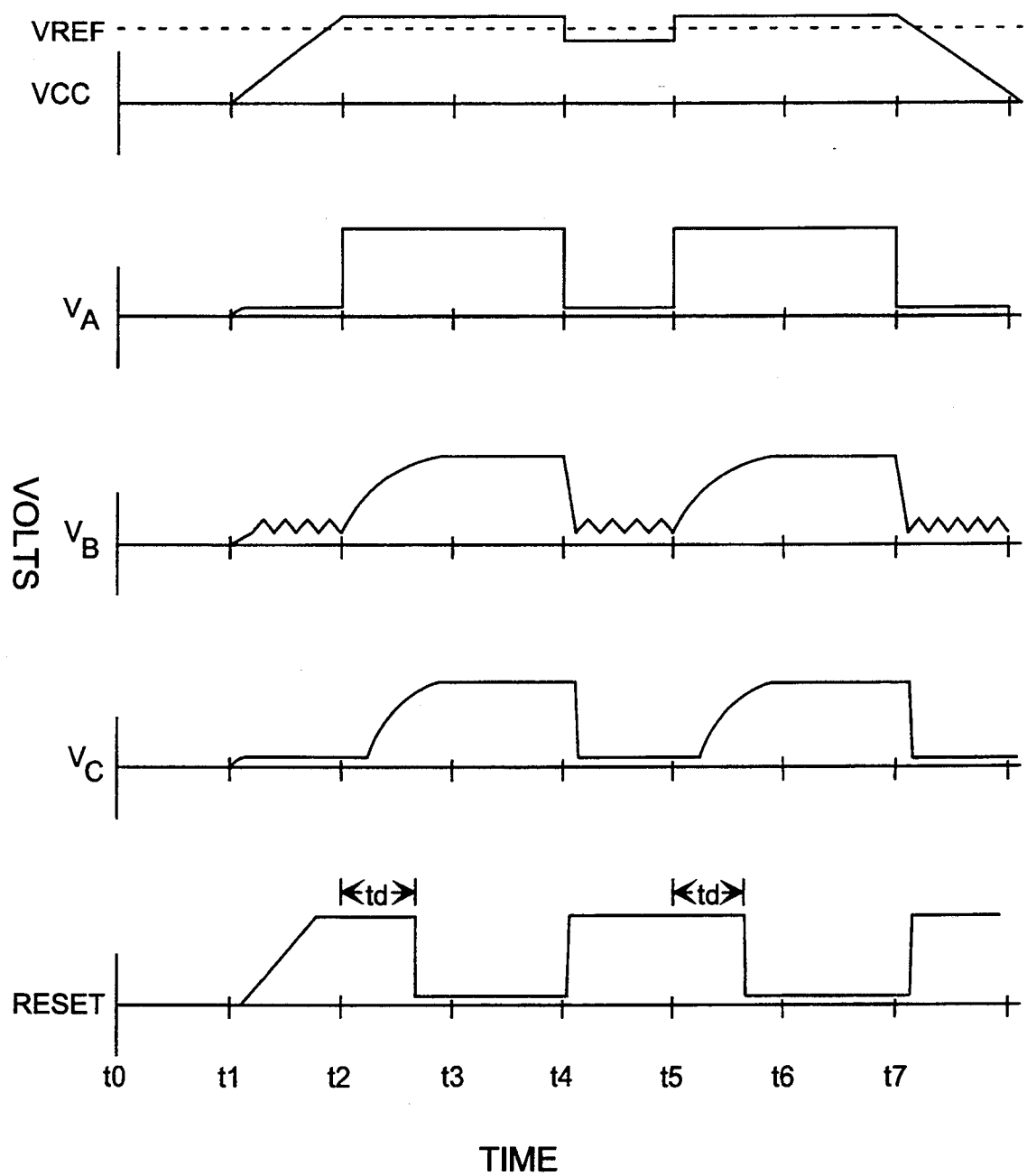
FIG. 2 is a timing diagram of the voltages produced in the undervoltage protection circuit according to the present invention.

Turning now to FIG. 2, a timing diagram of the various voltage levels which occur during operation of protection circuit 10 is illustrated. The timing diagram begins with a voltage supply which ramps from zero volts to an optimal voltage value, then drops to an undervoltage condition for a period of time, returns to an optimal voltage value, and then finally ramps downward again to zero volts. During an initial time t0, DC power supply is at an initial zero voltage level. At a time period after t0, or at time t1, VCC begins to turn on to its steady state value. VCC remains less than a reference voltage VREF during the time period between t1 and t2. The time period of t1 to t2 therefore represents an undervoltage condition causing voltage at node A, or $V_A$, to be drawn relatively low. A low voltage will also be recorded a nodes B and C, or $V_B$ and $V_C$, respectively, since capacitor C1 is discharged and Darlington pair 24 remains off. During this undervoltage time period, reset signal appears at the output of inverter 32 as shown.

At a time period between t2 and t4, VCC is no longer in the undervoltage condition causing a relatively high voltage to occur at $V_A$, $V_B$ and $V_C$. However, due to the delayed charging of capacitor C1, reset signal remains for a time delay period, td, after undervoltage period ceases, or after time t2 passes. Delay period td ensures that circuit 12 will remain inhibited for sufficient time to establish a known starting state.

Between time period t4 and t5, a temporary undervoltage exists causing reset signal to appear almost immediately after the undervoltage begins. There is very little delay due to the relatively rapid discharge of capacitor C1 through unijunction transistor 22. At time t5, after undervoltage ceases, the delay period, td, will remain to ensure that device 12 is ready to resume correct operation. Reset signal will disappear after delay period td ends, and reset will not appear again until after VCC drops below VREF, or at time t7.

It will be appreciated by those skilled in the art having the benefit of this disclosure that this invention is believed to be capable of applications with numerous types of electronic devices 12. Provided device 12 is capable of using a reset signal to inhibit its operation, device 12 can be of any logic family and can operate in either analog or digital format. Moreover, device 12 can be adequately protected for the duration of the undervoltage time period. Even if undervoltage exists for several minutes to several hours, the reset signal ensures that the device will remain inhibited throughout the undervoltage time period. By utilizing a protection circuit 10 which has a capacitive network capable of matching the damping of the load device 12, negative effects of power supply overshoot are minimized if not eliminated.

It is also to be understood that the form of the invention shown and described is to be taken as a presently preferred embodiment. Various modification and changes may be made without departing from the spirit and scope of the invention as set forth in the claims. It is intended that the following claims be interpreted to embrace all such modifications and changes.

What is claimed is:

1. An undervoltage protection circuit comprising:
   a sensing circuit capable of receiving a DC power supply voltage and a reference voltage;
   a latching network coupled to said sensing circuit, said latching network is adapted to discharge a storage capacitor to a latched voltage value during an undervoltage time period in which said DC power supply voltage is less than said reference voltage; and
   a buffer means for receiving said latched voltage value and for producing a reset signal during said undervoltage time period and for a set delay period after said undervoltage time period ceases.

2. The protection circuit as recited in claim 1, wherein said reset signal is a bistable signal which will remain in a fixed logic state for substantially said undervoltage time period.

3. The protection circuit as recited in claim 1, wherein said sensing circuit comprises:
   a voltage divider network and a diode network connected to said DC power supply voltage;
   a comparator having an output, an inverting input and a non-inverting input, said inverting input is connected to said voltage divider network and said non-inverting input is connected to said diode network; and
   a transistor having a collector connected to said latching network, an emitter connected to a ground voltage and a base connected to the output of said comparator.

4. The protection circuit as recited in claim 1, wherein said latching network comprises a conductive discharge path capable of being formed between said storage capacitor and a ground voltage.

5. The protection circuit as recited in claim 1, wherein said sensing circuit, said latching network and said buffer means are all powered by said DC power supply voltage.

6. The protection circuit as recited in claim 1, wherein said buffer means comprises:
   an amplifier having a voltage shifted output controlled by said storage capacitor; and
   a signal generator connected to said voltage shifted output for producing said reset signal.

7. The protection circuit as recited in claim 6, wherein said amplifier comprises:
   first and second transistors, each transistor having a collector, emitter and base, wherein the collector and emitter of the first transistor is connected to the collector and base, respectively, of the second transistor
   a pull-up resistor connected to the common connected collectors of the first and second transistors; and
   a pull-down resistor connected to the emitter of the second transistor.

8. The protection circuit as recited in claim 6, wherein said signal generator comprises a schmitt trigger.

9. A system for inhibiting the operation of a load device, comprising:
   a load device coupled to receive power from a DC power supply voltage;
   an undervoltage protection circuit powered by said DC power supply voltage and connected to send a reset signal to said load device during an undervoltage time period in which said DC power supply voltage is less than a reference voltage, to continue sending said reset signal for a set delay period after said voltage time period ceases, and to maintain coupling of said DC power supply voltage and to said load device during said undervoltage time period and during said set delay period after said undervoltage time period ceases, said protection circuit comprising:
      a sensing circuit adapted to compare said DC power supply voltage with said reference voltage and produce a relatively low voltage during said undervoltage time period;
      a latching network coupled to receive said low output voltage and programmably form a corresponding conductive discharge path;
      a current limiting resistor and storage capacitor coupled to said latching network to provide a discharge of said capacitor through said conductive discharge path; and
      a buffer means for receiving voltage from said discharged capacitor and for producing said reset signal.

10. The system as recited in claim 9, wherein said buffer means continues to produce said reset signal for a set delay period after the time in which said DC power supply voltage ceases to be less than said reference voltage.

11. The system as recited in claim 9, wherein said reset signal is a bistable signal which will remain in a fixed logic state for substantially said undervoltage time period.

12. The system as recited in claim 9, wherein said latching network comprises a programmable unijunction transistor having a gate, an anode and a cathode, said gate is connected to receive said relatively low voltage from the sensing circuit and produce corresponding said conductive discharge path from said anode to said cathode.

13. The system as recited in claim 12, wherein said gate is connected to a manual switch, said switch is adapted to manually couple said gate to a ground voltage.

14. The system as recited in claim 12, wherein said anode is connected to one end of said current limiting resistor, the other end of said current limiting resistor is connected to said DC power supply voltage, said current limiting resistor is appropriately sized to modulate the amount of current sent through said discharge path.

15. The system as recited in claim 9, wherein said buffer means comprises:
    an amplifier which includes:
       first and second transistors, each transistor having a collector, emitter and base, wherein the collector and emitter of the first transistor is connected to the collector and base, respectively, of the second transistor;
       a pull-up resistor connected to the common connected collectors of the first and second transistors;
       a pull-down resistor connected to the emitter of the second transistor; and
    a signal generator connected to the emitter of the second transistor.

16. A method for inhibiting the operation of a load device, comprising:
    providing a DC power supply connected to a load device;
    providing a protection circuit which includes a charged capacitor and a buffer network coupled to said charged capacitor;
    sensing a voltage from said DC power supply which is less than a reference voltage;
    discharging said capacitor to a latched voltage value; and
    level shifting said latched voltage value through said buffer network to produce a reset output signal for inhibiting said load device during times in which said DC power supply is less than a reference voltage and for inhibiting said load device for a set delay period after said DC power supply becomes greater than said reference voltage; and
    maintaining connection of said DC power supply to said load device during times in which said load device is inhibited.

17. The method as recited in claim 16, wherein said sensing step comprises:
    comparing said DC power supply voltage with said reference voltage; and
    outputting a relatively low voltage to a latching circuit connected to said charged capacitor whenever said DC power supply voltage is less than said reference voltage.

18. The method as recited in claim 16, wherein said discharging step comprises programmably forming a discharge path between said charged capacitor and a ground voltage.

19. The method as recited in claim 16, wherein said level shifting step comprises adjusting the magnitude of said reset signal to accommodate various logic magnitudes.

20. The method as recited in claim 16, further comprising continuing to produce said reset output for a set delay period after the time in which said DC power supply voltage ceases to be less than said reference voltage.

* * * * *